United States Patent [19]

Tischer

[11] Patent Number: 5,326,066
[45] Date of Patent: Jul. 5, 1994

[54] PRECISION PORTABLE SCANNING TABLE WITH ATTACHMENT APPARATUS

[75] Inventor: Steven N. Tischer, 831 Amsterdam Ave., Atlanta, Ga. 30306

[73] Assignee: Steven N. Tischer, Atlanta, Ga.

[21] Appl. No.: 952,671

[22] Filed: Sep. 25, 1992

[51] Int. Cl.⁵ .............................................. A47B 23/06
[52] U.S. Cl. ..................... 248/451; 248/510; 269/275
[58] Field of Search ............ 248/510, 451, 452, 453, 248/454; 269/254 CS, 239, 275; 24/67.5, 523; D19/88, 90, 91, 92

[56] References Cited

U.S. PATENT DOCUMENTS

| | | | |
|---|---|---|---|
| 1,797,889 | 3/1931 | Wiberg | 248/454 |
| 2,881,009 | 4/1959 | Delany | D19/88 X |
| 4,043,530 | 8/1977 | May | 248/453 |
| 4,553,728 | 11/1985 | Corsello | 248/452 |
| 5,024,428 | 6/1991 | Ramsay | 269/275 X |

FOREIGN PATENT DOCUMENTS 3011170 10/1980 Fed. Rep. of Germany ...... 248/451

Primary Examiner—Richard K. Seidel
Assistant Examiner—Kenneth E. Peterson

[57] ABSTRACT

A precision holder for hand-held optical scanning digitization devices is provided in which varying thicknesses of source documents may be securely held to a flat table by a support which also functions as a guide along which the scanning device may be accurately and repeatedly moved. In one embodiment, the original document is held by a guide held by a double hinge arrangement and secured by springs pulling toward the table. In another embodiment, the guide is held to the table by springs in a frame and track assembly much like a guillotine. For more accurate use of the scanning device a scanner alignment tray is provided for attachment to allow precise use of scanning devices which do not have a suitable square side to fit against the guide of the described scanning table.

6 Claims, 2 Drawing Sheets

PRECISION PORTABLE SCANNING TABLE WITH ATTACHMENT APPARATUS

BACKGROUND OF THE INVENTION

1. Field of the Invention

This invention relates generally to the field of computer accessories, and in particular to devices for the scanning of images for storage and processing by computers in the digital domain.

2. Description of the Prior Art

In informal parlance, scanning refers to the use of an optical machine to convert an image into a machine-readable file for manipulation, use, or printing by computers, so that term will be used for simplicity and clarity hereafter.

The design of a so called 'flat-bed' scanner looks and operates much like a photocopy machine in reverse: it has a glass window where the original is placed for scanning; the original is usually not moved during the scanning process; and the optical sensing part of the scanner itself is not physically manipulated by the operator during normal operation. All relative motion between the original and the scanning apparatus in a flat-bed scanner is done by the scanner itself. Because of the level of mechanical complexity involved with this design most flat bed scanners are relatively expensive. More inexpensive scanning is generally accomplished by using hand-held scanners.

Hand-held scanners have no internal mechanism for controlling the relation of the scanner to the source object. This relation is controlled by the user when he passes the scanner over the source document while holding the scanning button on. The digital quality of images retrieved by using hand-held scanners is actually quite high, but there is no easy method to precisely orient the scanner to the source document squarely, in relation to the natural X-Y axis of that document. Results of hand scanning are mostly unsatisfactory because the human hand can not pull the scanner in a perfectly vertical pattern from the top of a page to the bottom. Current hand scanners are capable of resolutions beginning at about 300 lines per inch; even the most steadfast human would find it difficult if not impossible not to stray a few hundredths of an inch to the left or right moving a scanner down a page. When the scanner is not moved in a square vertical fashion the resultant output has the entire scanned image slightly skewed horizontally along the page. This means perfectly vertical lines in the original image are incorrectly slanted. Though attempts have been made to correct skewed scans such as these with computer programs for straightening out the lines, there is no substitute for having a straight scan in the first place because there is always information loss.

Another problem with free hand use of hand scanners involves securely holding the original to be scanned. Even if the scanner is pulled in a fairly straight motion across the source document any movement of the original during the scanning process also results in skewed output.

Additionally, results are not repeatable with hand-held scanners because each scanning attempt yields a different relation between the source document and the scanner itself. As a result, there can be no reiterative refinement of subsequent scans. This can probably be best understood by contrasting with a flat bed scanner where the relation of the original to the scanning mechanism stays constant until the original is moved. This means the flat bed design can make a first pass to 'preview' what the final scan would look like. This kind of feature can not be used with hand scanners because the relation between the original image and the scanner is not constant among scanning attempts.

Current hand scanning systems suffer from a number of disadvantages:

(a) No capability for starting the scanner in the same part of the original image with each scan in a series.

(b) No provision for holding the original image securely.

(c) No provision for holding a thick original image, as in a book.

(d) No capability for restricting the motion of the scanner over the source image to follow a precise vertical path.

(e) No apparatus for physically orienting the scanner itself in a precise relation to other objects or images.

(f) No provision for aligning the relation of the scanner to the natural vertical orientation of the original image.

(g) No system of calibration for repeatedly relating the scanner to the original image.

SUMMARY OF THE INVENTION

In accordance with the preferred embodiments of the present invention, the proposed scanning table and scanner bracket provide a means for simultaneously holding the original image with an accurate and repositionable guide along which a standard hand scanner can be precisely and repeatedly moved.

In one embodiment, a double hinge arrangement is employed with external springs to allow the guide to be opened wide enough for thick source materials such as books yet also be adaptable enough to be able to hold a single sheet of paper. In another embodiment, the guide can be pressed against the scanning table by springs held in a frame extending all along the outside of the guide and anchored to the table at each end. In this embodiment, the addition of a longitudinal hole near the top of the guide would allow one-hand release of the guide. The user would grasp the hole and pull the guide up toward the top of the frame, thus pulling the entire guide away from the scanning table surface. In this way the space would be temporarily made for inserting the source document while leaving a hand free for the holding and positioning of that document. There will be necessary a compressible gasket on the face of the guide meeting the table so any thickness of paper can be firmly held by the guide. Calibration markings are incorporated along both the guide and the table to allow consistent repositioning of the scanner during multiple passes of the scanner.

A separate, horizontally-positioned guide stop can optionally be included to provide a place to begin the scan from each time. In one embodiment a separate hinged bracket could swing out from the main guide and lock into place; this second guide could be repositionable along the main guide to allow for different sizes of original image on the table. In another embodiment a small rocker could be designed into the table top to allow it to be flipped up so as to protrude above the table top. This small stop would perform the same function as described above: provide a consistent top starting place from which the scanner would begin. There could be multiple such rockers built into the scanning table top so that the closest one necessary could be used as needed.

Most hand scanners have a housing shape not ideal for squarely moving along a guide because there is usually no square side. A simple tray can be non-destructively added to an existing hand scanner housing in order to add the necessary square sides to allow it to be used precisely with the scanning table described in this document. This bracket can easily be installed as an after-market item by the purchaser of the described scanning table.

Objects and Advantages

Several objects and advantages of the present invention are:

(a) to provide a means of securely holding the original to be scanned in accurate orientation.

(b) to provide an accurate guide along which a scanner may be moved precisely and repeatedly over the original image regardless of the thickness of the original document to be scanned.

(c) to provide a 'stop' to which the scanner can be repeatedly oriented for the beginning of each scanning pass.

(d) to provide a guide which can be easily opened and closed with one hand while inserting or positioning the original source material with the other hand.

(e) to provide a bracket which can be mounted on currently used, irregularly-shaped scanners so they can be accurately operated in conjunction with the guide and scanning table as described in this document.

(f) to provide a design easily made cheaply and portable with the option of making all parts, including the alignment tray, detachable and storable in the back side of the main table for transport.

Further objects and advantages are to provide a comprehensive system which can be used easily and conveniently by both left and right-handed people, which can be used easily and conveniently to accurately hold a source document for scanning, without damage to the document or the scanner, which is simple to use and inexpensive to manufacture, which can be supplied made of plastic, which can be used repeatedly, and which obviates the need to use more expensive scanning devices to get accurate scanning results.

Still further objects and advantages will become apparent from a consideration of the ensuing description and drawings.

DRAWING FIGURES

In the drawings, closely related figures have the same number but different alphabetic suffixes.

Figure 1:
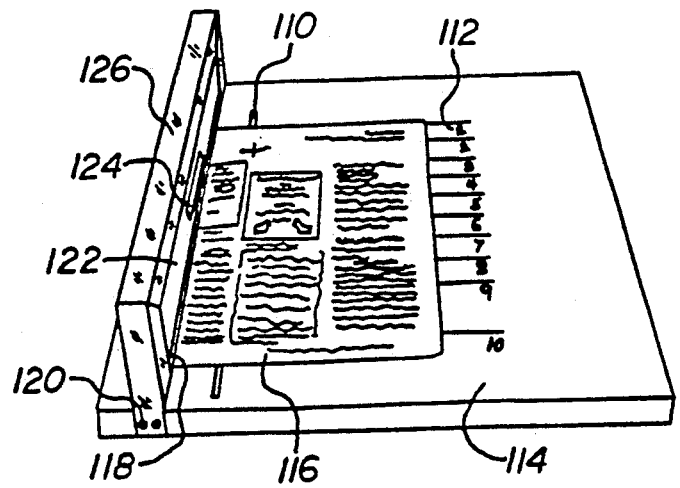
FIG. 1 shows various aspects of the claimed invention holding a source document.

| Reference Numerals In Drawings | |
|---|---|
| 110 aperture marking | 112 calibration markings |
| 114 table top | 116 source document |

| -continued | |
|---|---|
| Reference Numerals In Drawings | |
| 118 compressible gasket | 120 mounting screw |
| 122 guide | 124 guide release hole |
| 126 guide retaining bracket | 210 foot |
| 212 spring | 312 spring |
| 320 hinge | 322 hinge |
| 324 nut and bolt | 326 screw |
| 328 screw | 410 horizontal surface |
| 412 double-stick adhesive | 414 front rail |
| 416 hole | 418 right tray rail |
| 420 double-stick adhesive | 422 bottom |
| 424 left tray rail | 510 typical scanner shape |
| 512 optics area | |

DESCRIPTION OF THE PREFERRED EMBODIMENTS

A typical embodiment of the present invention is illustrated in FIG. 1. In the course of development it has been found that source documents 116 of varying thickness can be securely held against the scanning table 114 by means of a movable guide 122. Motion of the guide is constrained to vertical by the guide retaining bracket 126. Attached to the entire length of the guide 122 is a piece of compressible gasket material 118 which is pushed onto the source document 116. The guide retaining bracket 126 is fastened to the scanning table top 114 by fasteners 120. Calibration markings 110 serve to mark the nearest scannable area to the guide as well as aid in the placement of the material to be scanned squarely by marking various horizontal sections along the table 112. A guide release hole 124 is built into the center of the guide 122 large enough for inserting fingers. When grasped against the guide retaining bracket 126 the guide 122 can be easily lifted from the scanning table surface 114 with one hand using the guide release hole 124.

Figure 2A:
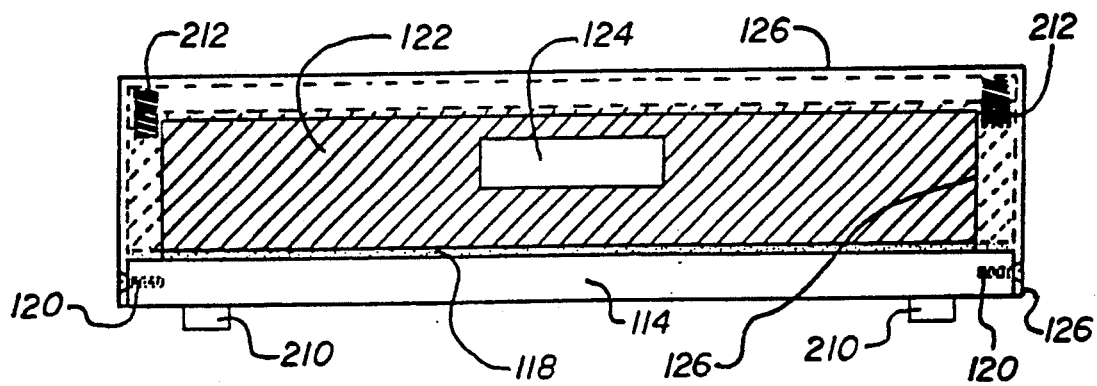
FIG. 2A shows the same embodiment as seen in FIG. 1 as viewed from the left side.
Figure 2B:
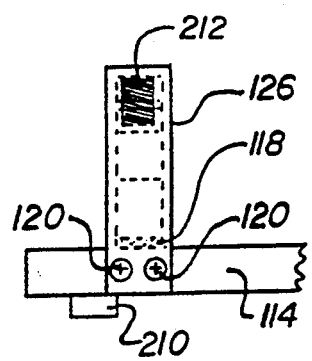
FIG. 2B shows the same embodiment as seen in FIG. 1 when viewed from the end of the guide assembly.

FIG. 2A shows a side view of the embodiment shown in FIG. 1. FIG. 2B shows the end view of this same embodiment looking at a guide mounting area. Pressure exerted by springs 12 between the guide retaining bracket 126 and the guide 122 push the guide 122 against the scanning table top 114 while compressing the gasket 118. The springs 212 fit in corresponding holes in the top of the guide. The guide retaining bracket 126 is a channel shape into which the guide 122 fits snugly while still allowing smooth vertical motion of the guide 122 within the guide retaining bracket 126. Feet 210 on the bottom of the table allow use on various surfaces.

FIG. 2B shows the vertical alignment of the guide assembly as shown in FIG. 1 and FIG. 2A.

Figure 3:
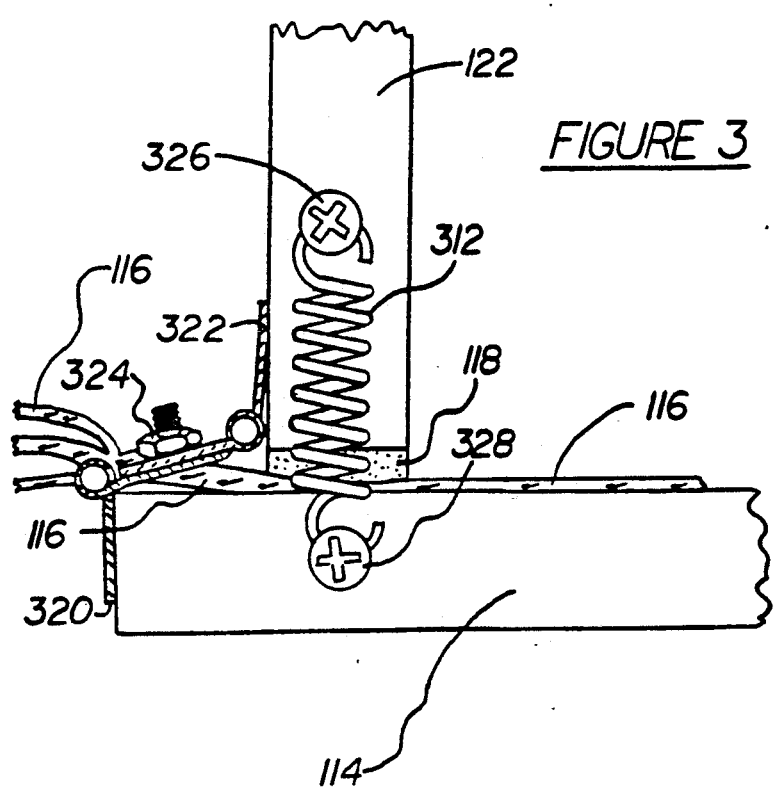
FIG. 3 shows an alternate embodiment utilizing a double hinge arrangement.

FIG. 3 shows an embodiment using a double hinge arrangement with the lower hinge 320 mounted to the scanning table top 114. The upper hinge 322 is mounted to the guide 122. The two hinges are fastened to each other by the fastener assembly 324 which allows the guide in this embodiment to be opened to varying amounts while maintaining squareness with the scanning table top 114. External springs 312 are fastened at each end of the guide with an upper screw 326 and a lower screw 328 at each end of the guide 122. The source document 116 is held firmly by the compressible gasket material 118. In this embodiment the guide 122 can be rotated to a point completely around the end and beneath the scanning table top 114.

Figure 4:
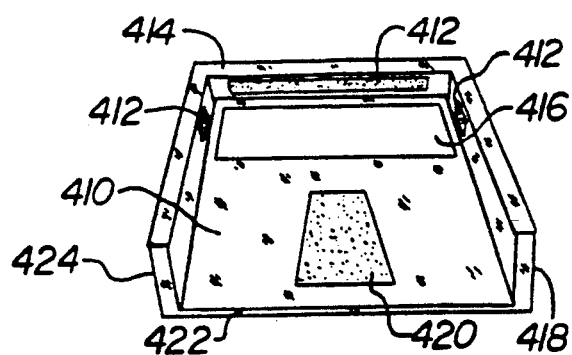
FIG. 4 shows the scanner alignment tray.
Figure 5:
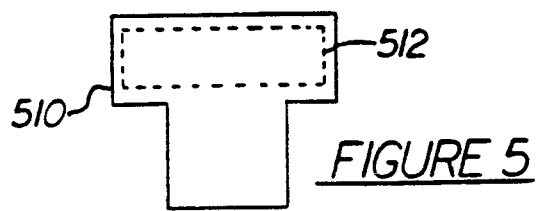
FIG. 5 shows the shape of a hand scanner typically found, when viewed from the top.

FIG. 4 shows an embodiment of the scanner alignment tray attachment. A typical hand scanner top view shape 510 can be seen in FIG. 5, including a typical scanner optics area 512. In a typical embodiment, the scanner alignment tray as shown in FIG. 4 holds the scanner by use of adhesive pad 420 on the horizontal mounting surface 410. There are also adhesive locations 412 to the right, left, and front inside of the tray. The entire tray may be made of very inexpensive plastic so as to be light in weight. The thickness of the bottom 422 of the tray should be kept as thin as possible so as not to lift the back of the scanner much higher from the source document than the front of the scanner. The hole 416 allows the scanner optics sensing area 512 to contact the source document 116 directly. For operation by a right-handed person the outside of the left tray rail 424 would be pulled along the guide 122 over the source document 116. For left-hand operation the outside of the right tray rail 418 could be pulled along the guide 122 in an opposite motion.

The foregoing description is provided to illustrate the present invention, but not to define its limits, which are set forth by the appended claims.

I claim:

1. A portable scanning table, for use with a hand-held optical scanner for scanning material to be scanned, said scanning table comprising a table having a length a flat top for receiving the material to be scanned, a guide carried by said table, said guide defining a continuous, linear, surface extending the length of the table for guiding movement of said scanner along said flat top of said table, means for confining motion of said guide to a linear path extending perpendicular to said flat top of said table, and means for resiliently urging said guide against said flat top, so that said material to be scanned can be held between said guide and said flat top, and said optical scanner can be slid along said linear surface of said guide for scanning said material to be scanned.

2. A portable scanning table as claimed in claim 1, and further including a compressible gasket flexed to said guide between said guide and said flat top of said table.

3. A portable scanning table as claimed in claim 2, wherein said guide includes a guide plate, and a bracket fixed to said table, said bracket defining channels for slidably receiving said guide plate, so that said guide plate is movable towards and away from said flat top.

4. A portable scanning table as claimed in claim 3, wherein said means for resiliently urging said guide against said flat top comprises springs within said channels for urging said guide plate toward said flat top.

5. A portable scanning table as claimed in claim 2, wherein said means for resiliently urging said guide against said flat top comprises at least one spring extending between said table and said guide.

6. A portable scanning table, for use with a hand-held optical sensor for scanning material to be scanned, said scanning table comprising a table having a flat top for receiving the material to be scanned, a guide carried by said table, means for preventing motion of said guide along said flat top of said table, and means for resiliently urging said guide against said flat top, so that said material to be scanned can be held between said guide and said flat top, and said optical scanner can be slid along said guide for scanning said material to be scanned, a compressible gasket fixed to said guide between said guide and said flat top of said table, wherein said means for resiliently urging said guide against said flat top comprises at least one spring extending between said table and said guide, and further including hinge means for movably attaching said guide to said table, said hinge means comprising a double hinge fixed to said guide and said table for allowing motion of said guide relative to said table.

* * * * *